(12) United States Patent
Arai

(10) Patent No.: US 11,956,394 B2
(45) Date of Patent: Apr. 9, 2024

(54) READING DEVICE AND METHOD FOR CONTROLLING READING DEVICE USING DOCUMENT INFORMATION

(71) Applicant: SEIKO EPSON CORPORATION, Tokyo (JP)

(72) Inventor: Kohei Arai, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/145,360

(22) Filed: Dec. 22, 2022

(65) Prior Publication Data
US 2023/0208994 A1  Jun. 29, 2023

(30) Foreign Application Priority Data

Dec. 27, 2021  (JP) ................................ 2021-213176

(51) Int. Cl.
*G06K 15/00* (2006.01)
*H04N 1/00* (2006.01)

(52) U.S. Cl.
CPC ..... *H04N 1/00816* (2013.01); *H04N 1/00612* (2013.01); *H04N 1/00801* (2013.01)

(58) Field of Classification Search
None
See application file for complete search history.

(56) References Cited

U.S. PATENT DOCUMENTS

| | | | |
|---|---|---|---|
| 2003/0100354 A1* | 5/2003 | Tomita | B41L 1/22 462/6 |
| 2017/0126911 A1* | 5/2017 | Kogi | H04N 1/0035 |
| 2018/0343353 A1* | 11/2018 | Fukumitsu | H04N 1/00734 |
| 2020/0296244 A1* | 9/2020 | Hirayama | H04N 1/00816 |
| 2021/0157830 A1* | 5/2021 | Chen | G06F 16/93 |
| 2021/0258433 A1* | 8/2021 | Otomaru | H04N 1/00037 |

FOREIGN PATENT DOCUMENTS

JP  2019-140628 A  8/2019

\* cited by examiner

*Primary Examiner* — Dung D Tran
(74) *Attorney, Agent, or Firm* — WORKMAN NYDEGGER

(57) ABSTRACT

A reading device includes a reading unit configured to read a document, and a control unit configured to acquire image data including a document region and a background region from the reading unit. The control unit acquires document information about a document, and sets, based on the document information, a background range indicating a range of a luminance value regarded as the background region.

9 Claims, 13 Drawing Sheets

| DOCUMENT INFORMATION | | | BACKGROUND ESTIMATION DATA | MARGIN DATA | BACKGROUND RANGE DATA |
|---|---|---|---|---|---|
| POSTURE INFORMATION | PATH INFORMATION | USAGE INFORMATION | | | |
| FIRST POSTURE | FIRST TRANSPORT PATH | CARRIER SHEET IS NOT USED | FIRST BACKGROUND ESTIMATION DATA | COMMON MARGIN DATA FIRST MARGIN DATA | FIRST BACKGROUND RANGE |
| SECOND POSTURE | SECOND TRANSPORT PATH | CARRIER SHEET IS USED | SECOND BACKGROUND ESTIMATION DATA | COMMON MARGIN DATA SECOND MARGIN DATA | SECOND BACKGROUND RANGE |

| DOCUMENT INFORMATION | | | BACKGROUND ESTIMATION DATA | MARGIN DATA | BACKGROUND RANGE DATA |
|---|---|---|---|---|---|
| POSTURE INFORMATION | PATH INFORMATION | USAGE INFORMATION | | | |
| FIRST POSTURE | FIRST TRANSPORT PATH | CARRIER SHEET IS NOT USED | FIRST BACKGROUND ESTIMATION DATA | COMMON MARGIN DATA FIRST MARGIN DATA | FIRST BACKGROUND RANGE |
| SECOND POSTURE | SECOND TRANSPORT PATH | CARRIER SHEET IS USED | SECOND BACKGROUND ESTIMATION DATA | COMMON MARGIN DATA SECOND MARGIN DATA | SECOND BACKGROUND RANGE |

FIG. 7

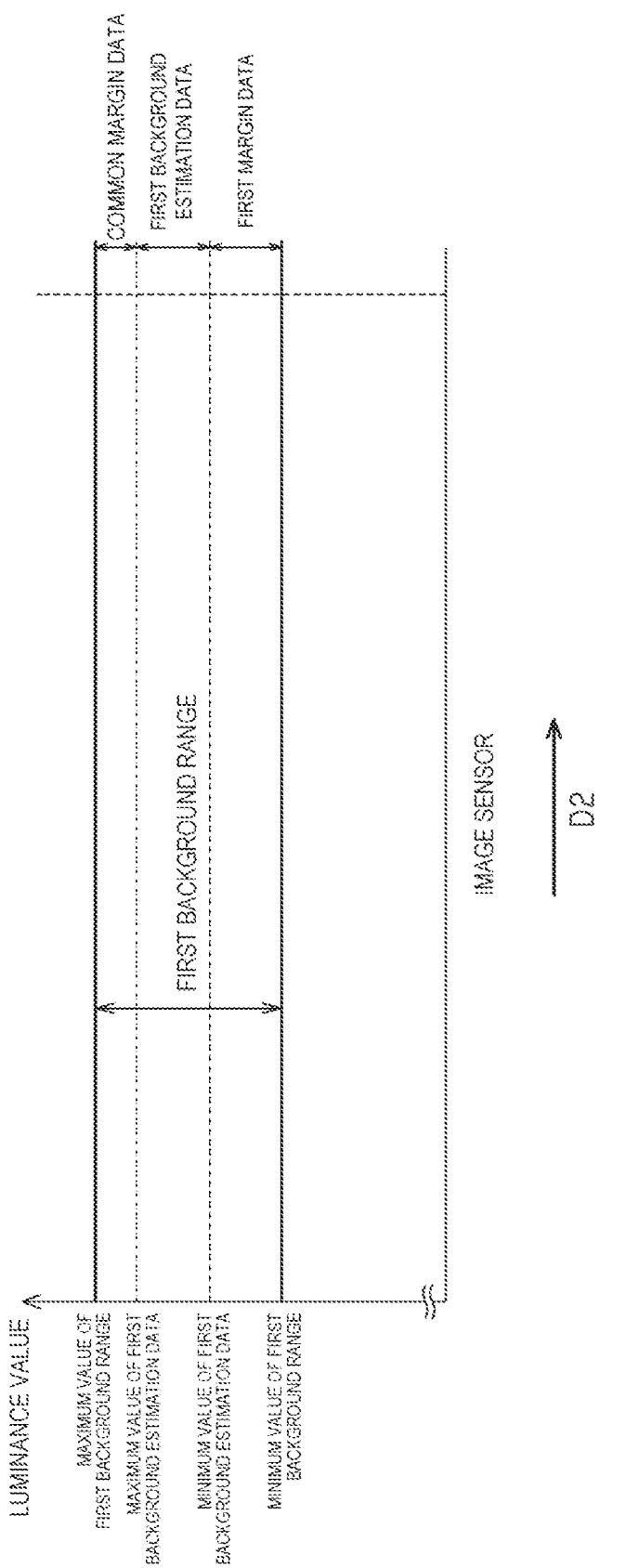

| DOCUMENT INFORMATION | | | BACKGROUND ESTIMATION DATA | MARGIN DATA | BACKGROUND RANGE DATA |
|---|---|---|---|---|---|
| POSTURE INFORMATION | PATH INFORMATION | USAGE INFORMATION | | | |
| FIRST POSTURE | FIRST TRANSPORT PATH | CARRIER SHEET IS NOT USED | FIRST BACKGROUND ESTIMATION DATA | COMMON MARGIN DATA FIRST MARGIN DATA | FIRST BACKGROUND RANGE |
| SECOND POSTURE | SECOND TRANSPORT PATH | CARRIER SHEET IS USED | SECOND BACKGROUND ESTIMATION DATA | COMMON MARGIN DATA SECOND MARGIN DATA | SECOND BACKGROUND RANGE |
| SECOND POSTURE | SECOND TRANSPORT PATH | CARRIER SHEET IS NOT USED | FIRST BACKGROUND ESTIMATION DATA | COMMON MARGIN DATA SECOND MARGIN DATA | THIRD BACKGROUND RANGE |

FIG. 10

READING DEVICE AND METHOD FOR CONTROLLING READING DEVICE USING DOCUMENT INFORMATION

The present application is based on, and claims priority from JP Application Serial Number 2021-213176, filed Dec. 27, 2021, the disclosure of which is hereby incorporated by reference herein in its entirety.

BACKGROUND

1. Technical Field

The present disclosure relates to a reading device and a method for controlling the reading device.

2. Related Art

JP-A-2019-140628 describes a reading device that detects, based on a luminance value, a document region from image data obtained by reading a document. In such a reading device, it may be difficult to detect a document region from image data depending on a type of a document to be read. The reading device described in JP-A-2019-140628 proposes an appropriate method for reading a document to a user when a document region cannot be appropriately detected.

The reading device described in JP-A-2019-140628 proposes the appropriate method after a document is read once. Thus, it takes time and effort for the reading device to appropriately read a document.

SUMMARY

A reading device that solves the problem described above includes a reading unit configured to read a document, and a control unit configured to acquire image data including a document region and a background region from the reading unit, where the control unit acquires document information about a document, and sets, based on the document information, a background range indicating a range of a luminance value regarded as the background region.

A method for controlling a reading device that solves the problem described above is a method for controlling a reading device configured to read a document, and includes acquiring document information about a document, and setting, based on the document information, a background range indicating a range of a luminance value regarded as a background region.

BRIEF DESCRIPTION OF THE DRAWINGS

FIG. 7 is a table illustrating an example of a relationship between a background range and other information.
FIG. 8 is a graph illustrating a first background range.
FIG. 10 is a table illustrating another example of the relationship between the background range and the other information.

DESCRIPTION OF EXEMPLARY EMBODIMENTS

One embodiment of a reading device will be described below with reference to the drawings. The reading device is, for example, a sheet feed scanner in which a fixed reading unit reads a document such as paper and a film to be transported. The reading device is not limited to the sheet feed scanner, and may be a flatbed scanner.

Figure 1:
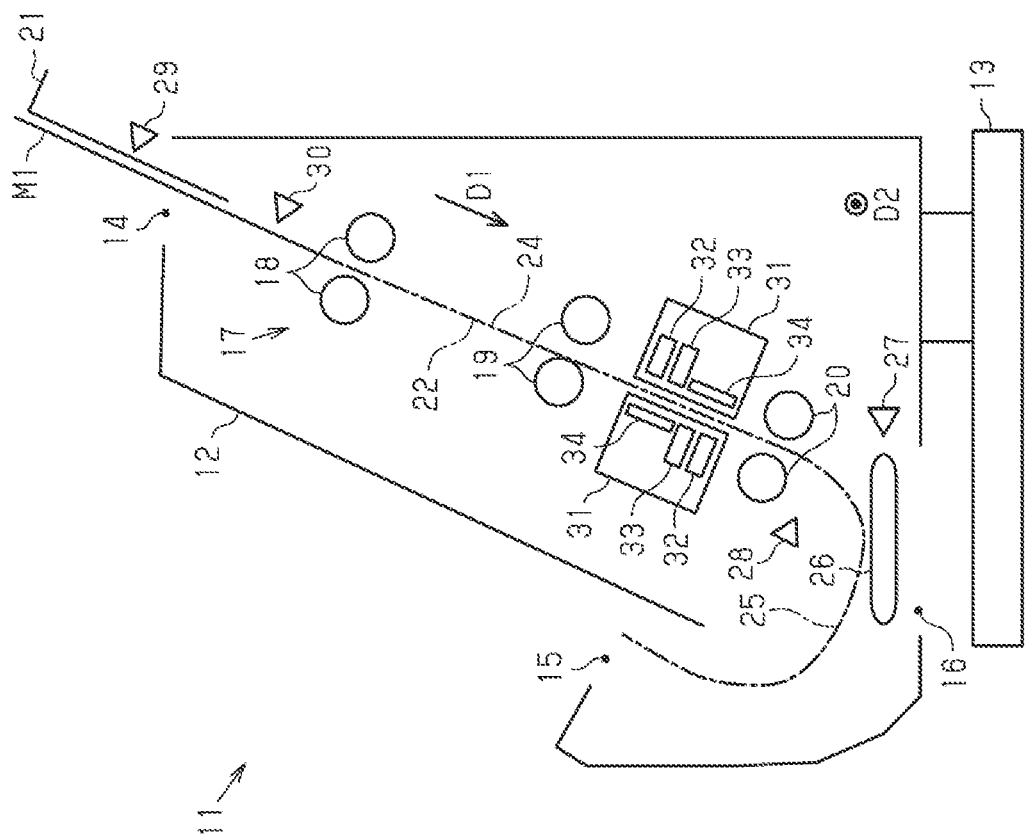
FIG. 1 is a side view of a reading device in a first posture.
Figure 2:
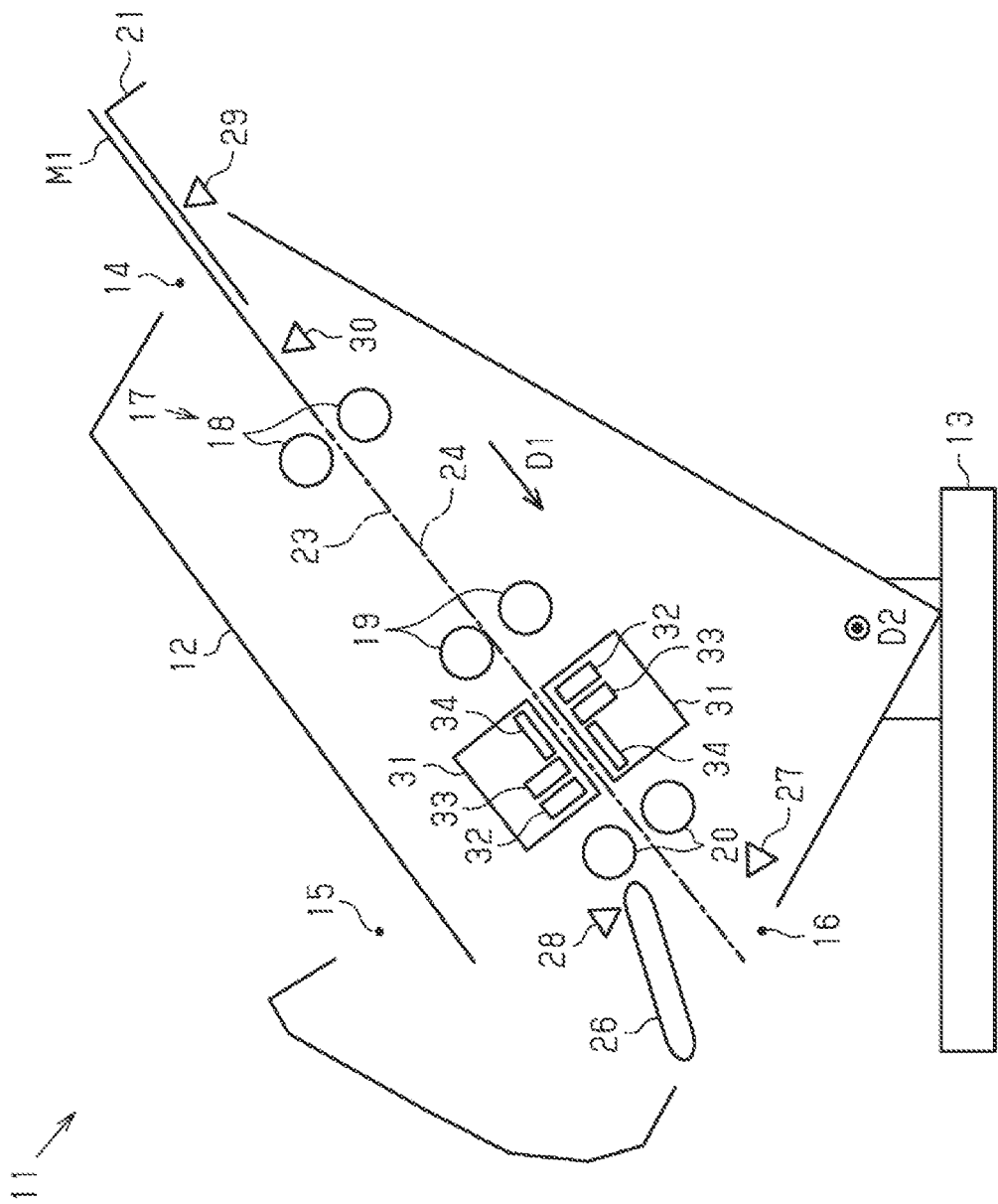
FIG. 2 is a side view of the reading device in a second posture.

As illustrated in FIGS. 1 and 2, a reading device 11 includes a housing 12 and a base 13. The housing 12 is supported on the base 13. The base 13 is installed on, for example, a horizontal plane. The housing 12 is formed rotatably with respect to the base 13.

A supplying port 14 and one or more discharge ports are open in the housing 12. The supplying port 14 is an opening through which a document M1 is supplied. The document M1 enters the housing 12 through the supplying port 14. The discharge port is an opening through which the document M1 is discharged. The document M1 is discharged from the housing 12 through the discharge port. In the present example, a first discharge port 15 and a second discharge port 16 are open in the housing 12.

The housing 12 is formed so as to have a switchable posture. For example, the housing 12 rotates with respect to the base 13 to switch the posture of the housing 12. The housing 12 is switched between, for example, a first posture and a second posture. In FIG. 1, the housing 12 has the first posture. In FIG. 2, the housing 12 has the second posture. The housing 12 rotates clockwise in FIG. 1, and thus the housing 12 switches from the first posture to the second posture. An inclination of the housing 12 with respect to the base 13 changes between when the housing 12 has the first posture and when the housing 12 has the second posture. When the housing 12 has the first posture, a foot space of the reading device 11 is reduced as compared to when the housing 12 has the second posture.

The reading device 11 includes a transport unit 17. The transport unit 17 is formed so as to transport the document M1. The transport unit 17 includes, for example, one or more rollers. The transport unit 17 includes, for example, a first roller pair 18, a second roller pair 19, and a third roller pair 20. The transport unit 17 transports the document M1 in a sub scanning direction D1.

The reading device 11 includes a tray 21. The tray 21 extends from the inside of the housing 12 toward the outside of the housing 12 through the supplying port 14. The document M1 before reading is set in the tray 21. One or more documents M1 are loaded in the tray 21.

The reading device 11 includes one or more transport paths. The transport path is a path through which the document M1 is transported by the transport unit 17. The transport path extends inside the housing 12. The reading device 11 includes, for example, a first transport path 22 and a second transport path 23.

The first transport path 22 extends from the supplying port 14 toward the first discharge port 15. The first transport path 22 is a path indicated by a dot chain line in FIG. 1. The first transport path 22 includes, for example, a shared portion 24. The shared portion 24 is a portion shared between the first transport path 22 and the second transport path 23. The shared portion 24 extends in a straight line or linearly. An extending direction of the shared portion 24 is the sub scanning direction D1.

The first transport path 22 includes a curved portion 25. The curved portion 25 extends from the shared portion 24. The curved portion 25 is curved in, for example, a U-shape. The first transport path 22 is used when, for example, the housing 12 has the first posture. In other words, when the housing 12 has the first posture, the document M1 is transported through the first transport path 22.

The second transport path 23 extends from the supplying port 14 toward the second discharge port 16. The second transport path 23 is a path indicated by a dot chain line in FIG. 2. The second transport path 23 includes, for example, the shared portion 24. The second transport path 23 is a path extending in a straight line or linearly. The second transport path 23 does not include the curved portion 25. The second transport path 23 is used when, for example, the housing 12 has the second posture. In other words, when the housing 12 has the second posture, the document M1 is transported through the second transport path 23. In the present example, in the reading device 11, the path through which the document M1 is transported switches depending on the posture of the housing 12.

The posture of the housing 12 switches to change an angle of the shared portion 24 with respect to the horizontal plane. In the present example, when the housing 12 has the second posture, the angle of the shared portion 24 with respect to the horizontal plane is gentler than that when the housing 12 has the first posture.

In the reading device 11, the transport path suitable for transport of the document M1 varies according to a type of the document M1. For example, when the document M1 having a great thickness is read, the second transport path 23 may be used. In a case in which the document M1 has a great thickness, when the document M1 passes through the curved portion 25, a transport failure may occur. Thus, when the document M1 having a small thickness is read, the first transport path 22 can be used. When the document M1 having a small thickness is read, the transport path is not limited to the first transport path 22, and the second transport path 23 may be used. In other words, for usage of the first transport path 22, a type of the document M1 is limited. On the other hand, for usage of the second transport path 23, a type of the document M1 is not limited.

The reading device 11 may read the document M1 while the document M1 is sandwiched between carrier sheets. In this case, the second transport path 23 is used. The carrier sheet is a sheet formed so as to sandwich the document M1 by a transparent film. The carrier sheet is transported together with the document M1 in the second transport path 23 while the carrier sheet sandwiches the document M1. For example, even when the document M1 has an extremely small size, the reading device 11 can read the document M1 by using the carrier sheets.

The reading device 11 includes a path switching member 26. The path switching member 26 is, for example, a flap. The path switching member 26 switches the path through which the document M1 is transported to the first transport path 22 or the second transport path 23. The path switching member 26 switches the path through which the document M1 is transported by blocking the first transport path 22 or the second transport path 23. When the path switching member 26 blocks the first transport path 22, the document M1 is transported through the second transport path 23. When the path switching member 26 blocks the second transport path 23, the document M1 is transported through the first transport path 22.

For example, the path switching member 26 operates in conjunction with the posture of the housing 12. When the housing 12 has the first posture, the path switching member 26 blocks the second transport path 23. When the housing 12 has the second posture, the path switching member 26 blocks the first transport path 22. The path switching member 26 may be displaced regardless of the posture of the housing 12. In other words, the path may be switched by the path switching member 26 regardless of the posture of the housing 12.

The reading device 11 may include, for example, one or more sensors. The reading device 11 may include, for example, a sensor that detects a state of the document M1, a sensor that detects a state of the reading device 11, and the like.

The reading device 11 may include, for example, one or more posture detection sensors that detect the posture of the housing 12. The reading device 11 may include, for example, a first posture detection sensor 27 that detects the housing 12 having the first posture. For example, the first posture detection sensor 27 is formed so as to detect the path switching member 26 that blocks the second transport path 23. Therefore, when the first posture detection sensor 27 detects the path switching member 26, it can be recognized that the housing 12 has the first posture.

The reading device 11 may include, for example, a second posture detection sensor 28 that detects the housing 12 having the second posture. For example, the second posture detection sensor 28 is formed so as to detect the path switching member 26 that blocks the first transport path 22. Therefore, when the second posture detection sensor 28 detects the path switching member 26, it can be recognized that the housing 12 has the second posture.

The reading device 11 may be formed so as to detect the housing 12 having the first posture when the first posture detection sensor 27 detects the path switching member 26, and detect the housing 12 having the second posture when the first posture detection sensor 27 does not detect the path switching member 26. The reading device 11 may be formed so as to detect the housing 12 having the second posture when the second posture detection sensor 28 detects the path switching member 26, and detect the housing 12 having the first posture when the second posture detection sensor 28 does not detect the path switching member 26. In this case, one posture detection sensor is enough. The posture detection sensor is not limited to the sensor that detects the path switching member 26, and may be, for example, a gyroscope sensor. When the posture detection sensor is the gyroscope sensor, the reading device 11 may separately include a sensor that detects a position of the path switching member 26.

The reading device 11 may include, for example, a size detection sensor 29 that detects a size of the document M1 set in the tray 21. The size detection sensor 29 is located in the tray 21, for example. The size detection sensor 29 includes, for example, a plurality of optical sensors. The plurality of optical sensors included in the size detection sensor 29 are aligned in a single row on the tray 21. The size detection sensor 29 detects the size of the document M1, based on a detection result of the plurality of optical sensors. For example, a larger size of the document M1 set in the tray 21 increases the number of the optical sensors overlapping the document M1. In such a manner, the size detection sensor 29 detects the size of the document M1 according to the number of the optical sensors overlapping the document M1.

The reading device 11 may include a thickness detection sensor 30 that detects a thickness of the document M1 set in the tray 21. The thickness detection sensor 30 is located in the housing 12, for example. The thickness detection sensor 30 is, for example, an ultrasonic sensor or an optical sensor.

The reading device 11 includes one or more reading units 31. The reading unit 31 is formed so as to read the document M1. The reading unit 31 reads the document M1 transported through the first transport path 22 and the document M1 transported through the second transport path 23. The reading unit 31 is accommodated in the housing 12.

The reading device 11 includes, for example, two reading units 31. The two reading units 31 are located so as to sandwich the first transport path 22. The two reading units 31 are located so as to sandwich the second transport path 23. Specifically, the two reading units 31 are located so as to sandwich the shared portion 24. The two reading units 31 face each other. The reading unit 31 is long in a main scanning direction D2. The main scanning direction D2 is a direction different from the sub scanning direction D1.

The two reading units 31 each read a different surface of the document M1. One reading unit 31 of the two reading units 31 reads a front surface of the document M1. The other reading unit 31 of the two reading units 31 reads a back surface of the document M1. In this way, the reading device 11 reads one side of the document M1 or both sides of the document M1.

The reading unit 31 includes a light source 32. The light source 32 is, for example, an LED, a fluorescent lamp, and the like. The light source 32 irradiates the facing reading unit 31 with light.

The reading unit 31 includes a plurality of image sensors 33. The plurality of image sensors 33 are aligned in the main scanning direction D2. The plurality of image sensors 33 are modularized. The image sensor 33 is, for example, a contact-type image sensor. Specifically, the image sensor 33 is a CMOS image sensor. The image sensor 33 performs photoelectric conversion on received light. The image sensor 33 outputs an output signal having a value corresponding to the amount of the received light.

The image sensor 33 may be a monochrome sensor, or may be a color sensor. The reading unit 31 may be formed so as to read the document M1 in full color. For example, the reading unit 31 may be formed so as to read the document M1 in three colors of RGB. The reading unit 31 may be formed so as to read the document M1 in grayscale.

The reading unit 31 includes a background plate 34. For example, the background plate 34 faces the image sensor 33 and the light source 32 that are included in the other reading unit 31. The background plate 34 is irradiated with the light from the light source 32 included in the facing reading unit 31. The background plate 34 reflects the irradiated light. The light reflected by the background plate 34 is incident on the image sensor 33 included in the reading unit 31 facing the background plate 34. The background plate 34 is read together with the document M1 by the image sensor 33. The background plate 34 is read as a background together with the document M1 by the image sensor 33.

In the background plate 34, for example, at least a surface facing the image sensor 33 has a color except for white and black. The background plate 34 is gray, for example. The color of the background plate 34 may be a color that can distinguish the document M1 from the background when the image sensor 33 reads the background plate 34 together with the document M1. For example, when a usage frequency of the document M1 having a blue-based ground color is high, a color other than the blue-based color may be selected as the color. For example, when a usage frequency of the document M1 having a green-based ground color is high, a color other than the green-based color may be selected as the color. For example, when a usage frequency of the document M1 having a red-based ground color is high, a color other than the red-based color may be selected as the color. The present example employs gray as an example of the color since it is easy to distinguish, from the background, even the document M1 of a chromatic color such as the blue-based color, the green-based color, and the red-based color in addition to a white-based color.

Figure 3:
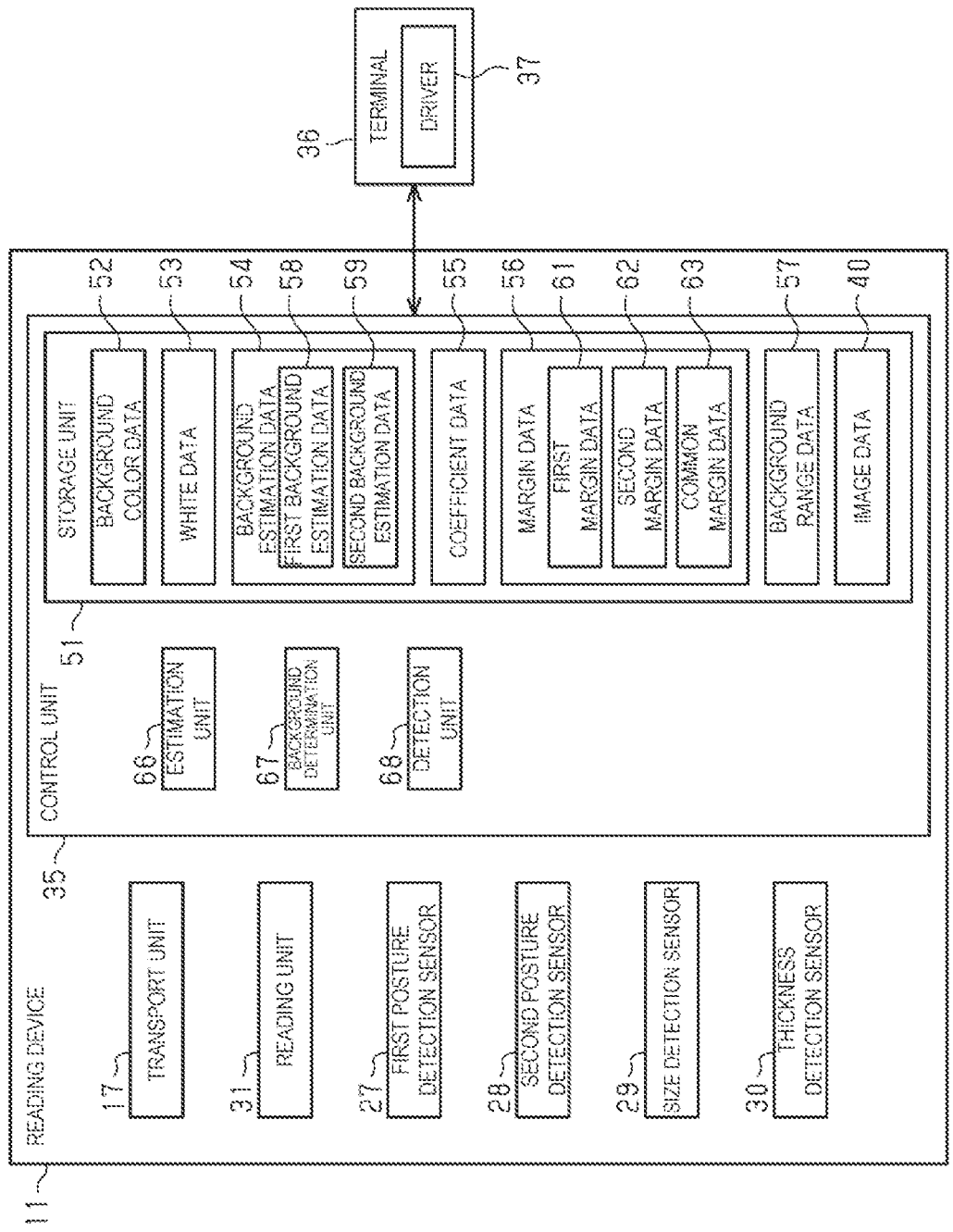
FIG. 3 is a block diagram illustrating an electrical configuration of the reading device.

As illustrated in FIG. 3, the reading device 11 includes a control unit 35. The control unit 35 controls the reading device 11. The control unit 35 controls, for example, the transport unit 17, the reading unit 31, and the like. The control unit 35 may be formed as a circuit including α: one or more processors that perform various types of processing according to a computer program, β: one or more dedicated hardware circuits, such as an application-specific integrated circuit, that perform at least some of the various types of processing, or γ: a combination thereof. The processor includes a CPU and a memory such as RAM and ROM, and the memory stores a program code or a command formed so as to cause the CPU to perform the processing. The memory, that is, a computer readable medium includes all kinds of readable media accessible by a general purpose or dedicated computer.

The control unit 35 is formed to be communicable with a terminal 36 operated by a user. A driver 37 for communicating with the reading device 11 is installed in the terminal 36. The terminal 36 is, for example, a personal computer, a smartphone, or the like.

The control unit 35 acquires document information being information about the document M1. Specifically, the control unit 35 acquires the document information being the information about the document M1 to be read in the future. The control unit 35 may acquire the document information, based on a detection signal of the sensor, or may acquire the document information from the terminal 36.

The document information includes, for example, posture information. The posture information is information indicating the posture of the housing 12. The posture information includes, for example, information indicating that the housing 12 has the first posture, or information indicating that the housing 12 has the second posture.

The document information includes, for example, path information. The path information is information indicating the path through which the document M1 is transported. The path information includes, for example, information indicating that the document M1 is transported through the first transport path 22, or information indicating that the document M1 is transported through the second transport path 23.

The document information includes, for example, usage information. The usage information is information indicating whether the carrier sheets are used. The usage information includes, for example, information indicating that the document M1 is transported while the document M1 is sandwiched between the carrier sheets, or information indicating that the document M1 is transported while the document M1 is not sandwiched between the carrier sheets.

The document information includes, for example, document size information. The document size information is information indicating the size of the document M1. The document information includes, for example, document thickness information. The document thickness information is information indicating the thickness of the document M1.

When the control unit 35 acquires the document information from the terminal 36, the document information is information input to the driver 37. In other words, the document information is input by a user.

The control unit 35 acquires, for example, the posture information and the path information from a detection signal of the first posture detection sensor 27 and a detection signal of the second posture detection sensor 28. The control unit 35 acquires, for example, the document size information from a detection signal of the size detection sensor 29. The control unit 35 acquires, for example, the document thickness information from a detection signal of the thickness detection sensor 30.

The control unit 35 may acquire the usage information from a detection signal of the first posture detection sensor 27 and a detection signal of the second posture detection sensor 28. For example, the usage information may be associated with the posture information or the path information. For example, when the document M1 is transported in a sandwiched state between the carrier sheets, the second transport path 23 is used. The control unit 35 may acquire the usage information from a detection signal of the thickness detection sensor 30. The thickness detection sensor 30 can detect whether the document M1 set in the tray 21 is sandwiched between the carrier sheets.

The control unit 35 acquires image data from the reading unit 31. Specifically, the control unit 35 receives a detection signal from the reading unit 31. The control unit 35 acquires the image data by performing A/D conversion on the detection signal. When the control unit 35 acquires the image data, the control unit 35 may perform shading correction, gamma correction, and the like on the detection signal.

Figure 4:
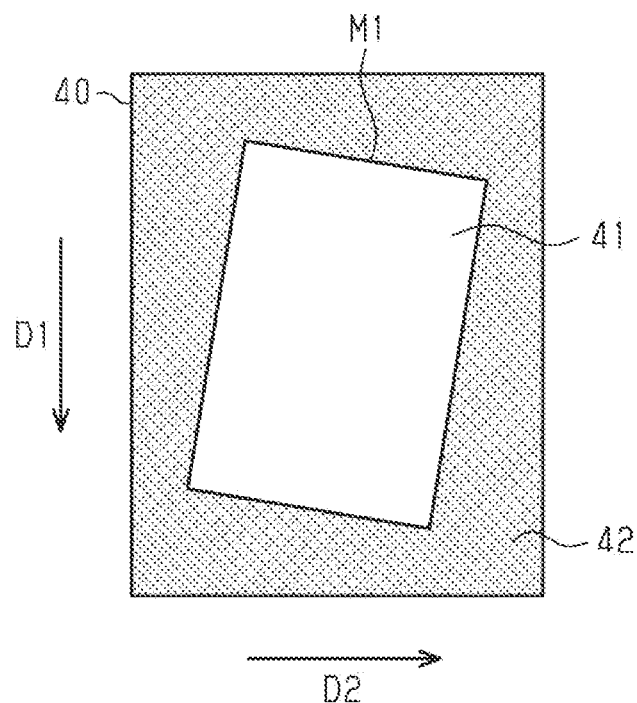
FIG. 4 is a schematic view illustrating an example of image data when a carrier sheet is not used.

As illustrated in FIG. 4, image data 40 includes a document region 41 and a background region 42. The document region 41 is a region indicating a pixel generated by reading the document M1. The background region 42 is a region indicating a pixel generated by reading the background plate 34.

The control unit 35 detects the document region 41 from the image data 40. Specifically, the control unit 35 detects the document region 41 by regarding, as the background region 42, a pixel indicating a luminance value included in a background range. The background range is a range of the luminance value regarded as the background region 42 in the image data 40. In this way, the document region 41 is cut out from the image data 40.

When a color of the document M1 and a color of the background plate 34 are close, a luminance value of the document region 41 is close to the luminance value of the background region 42 in the image data 40. When the luminance value of the document region 41 is close to the luminance value of the background region 42, it is difficult to distinguish the document region 41 from the background region 42. Particularly, when the background range is large, the luminance value of the document region 41 is more likely to be included in the background region 42. In this case, detection accuracy of the document region 41 may decrease. For example, when an individual difference of the reading device 11 is taken into consideration and a large background range is set in the reading device 11, the detection accuracy of the document region 41 may decrease.

In a case in which the thickness of the document M1 is great, when the document M1 passes between the two reading units 31, an interval between the reading units 31 may be increased due to the document M1 coming into contact with the reading unit 31. In this case, a distance between the image sensor 33 and the background plate 34 facing the image sensor 33 is increased. Thus, when the document M1 having a great thickness is read, the luminance value of the background region 42 is more likely to be smaller than that when the document M1 having a small thickness is read. In other words, the background region 42 is more likely to be dark.

Figure 5:
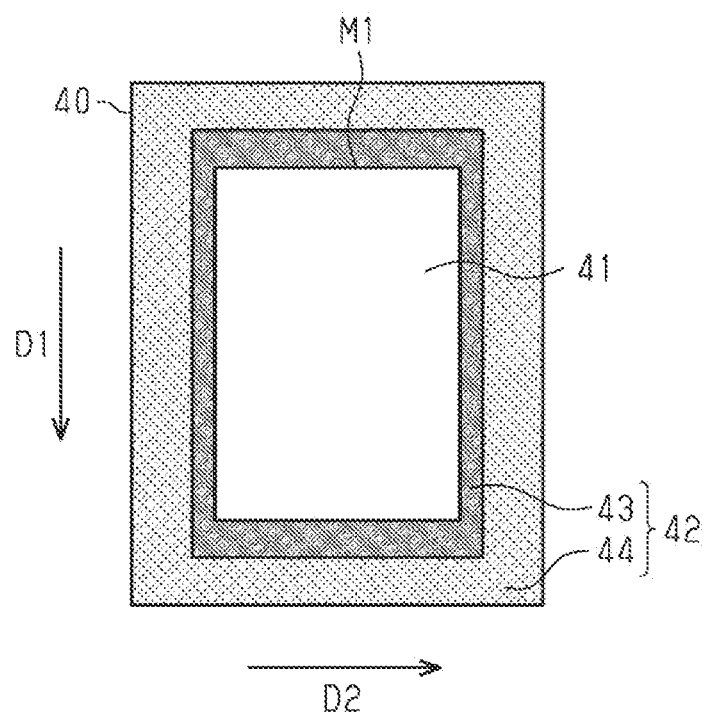
FIG. 5 is a schematic view illustrating an example of image data when the carrier sheet is used.

As illustrated in FIG. 5, when the document M1 is sandwiched between the carrier sheets, the luminance value of the background region 42 is more likely to be small similarly to when the document M1 having a great thickness is transported. Since the carrier sheet is transported together with the document M1 when the document M1 is sandwiched in the carrier sheet, an interval between the reading units 31 may be increased due to the carrier sheet coming into contact with the reading units 31.

When the document M1 is sandwiched in the carrier sheet, a first pixel 43 generated by reading the background plate 34 through the carrier sheet is included in the background region 42. A luminance value of the first pixel 43 is smaller than a luminance value of a second pixel 44 generated by reading the background plate 34 without the carrier sheet interposed therebetween. Therefore, when the document M1 is sandwiched between the carrier sheets, the luminance value of the background region 42 is more likely to be small. From this perspective, the background range may be set in accordance with the document M1 in the reading device 11.

As illustrated in FIG. 3, the control unit 35 includes a storage unit 51. In other words, the reading device 11 includes the storage unit 51. The storage unit 51 is formed of, for example, a non-volatile memory. The storage unit 51 stores the various types of programs performed by the control unit 35. The storage unit 51 stores, for example, background color data 52, white data 53, background estimation data 54, coefficient data 55, margin data 56, background range data 57, the image data 40, and the like in addition to the programs.

The background color data 52 and the white data 53 are data for defining the background range. The background color data 52 and the white data 53 are used to define the background estimation data 54. For example, the background color data 52 and the white data 53 are individually set for the two reading units 31. The background color data 52 and the white data 53 are previously stored in the storage unit 51.

The background color data 52 and the white data 53 are data based on background reference data, white reference data, and black reference data. The background reference data, the white reference data, and the black reference data are data acquired under the same condition. The background reference data, the white reference data, and the black reference data are acquired under, for example, the same temperature condition.

The background reference data is acquired by the image sensor 33 reading the background plate 34 while the light source 32 turns on. The white reference data is acquired by the image sensor 33 reading a white reference chart while the light source 32 turns on. The white reference chart is, for example, a white sheet. The black reference data is acquired by the image sensor 33 reading the background plate 34 while the light source 32 turns off. The background reference data, the white reference data, and the black reference data are data indicating a luminance value detected by each of the plurality of image sensors 33 by the technique described above.

The background color data 52 is acquired by subtracting the luminance value indicated by the black reference data from the luminance value indicated by the background reference data. The white data 53 is acquired by subtracting the luminance value indicated by the black reference data from the luminance value indicated by the white reference data. The background color data 52 and the white data 53 are data indicating the luminance value corresponding to each of the plurality of image sensors 33.

The background estimation data 54 is data for defining the background range. The background estimation data 54 is used to define the background range data 57. The background estimation data 54 is calculated based on the background color data 52 and the white data 53. The background estimation data 54 is data indicating the luminance value estimated to be acquired when the plurality of image sensors 33 read the background plate 34. The calculation of the background estimation data 54 will be described below. In the present example, the background estimation data 54 is acquired by being calculated by the control unit 35, but the background estimation data 54 may be previously stored in the storage unit 51, for example.

The background estimation data 54 includes first background estimation data 58 and second background estimation data 59. The first background estimation data 58 is data indicating the luminance value for defining the background range. The first background estimation data 58 is data indicating the luminance value estimated to be acquired when the plurality of image sensors 33 read the background plate 34 without using the carrier sheets. The first background estimation data 58 is calculated based on the background color data 52 and the white data 53. The second background estimation data 59 is data indicating the luminance value for defining the background range. The second background estimation data 59 is data indicating the luminance value estimated to be acquired when the plurality of image sensors 33 read the background plate 34 while the carrier sheet is used. The second background estimation data 59 is calculated based on the first background estimation data 58 and the coefficient data 55.

The coefficient data 55 is data for defining the background range. The coefficient data 55 is used to define the second background estimation data 59. The coefficient data 55 is previously stored in the storage unit 51. The coefficient data 55 is data indicating a coefficient by which the first background estimation data 58 is multiplied. The second background estimation data 59 is calculated by multiplying the luminance value indicated by the first background estimation data 58 by a value indicated by the coefficient data 55. Note that, when the first background estimation data 58 and the second background estimation data 59 are previously stored in the storage unit 51, the coefficient data 55 is unnecessary.

The margin data 56 is data for defining the background range. The margin data 56 is used to define the background range. The margin data 56 is previously stored in the storage unit 51. The margin data 56 is data indicating a value added to the luminance value indicated by the background estimation data 54, and a value subtracted from the luminance value indicated by the background estimation data 54. The margin data 56 includes, for example, first margin data 61, second margin data 62, and common margin data 63.

The first margin data 61 is a value subtracted from the luminance value indicated by the background estimation data 54. The second margin data 62 is a value subtracted from the luminance value indicated by the background estimation data 54. The value indicated by the second margin data 62 is greater than the value indicated by the first margin data 61. The common margin data 63 is a value added to the luminance value indicated by the background estimation data 54.

The background range data 57 is data indicating the background range. In other words, the background range data 57 is data indicating a range of the luminance value regarded as the background region 42 in the image data 40. The background range data 57 is determined based on, for example, the background estimation data 54 and the margin data 56. The background range data 57 is set by the control unit 35 every time the reading unit 31 reads the document M1, for example. In other words, the background range data 57 is set for each document M1.

The control unit 35 functions as a function unit such as, for example, an estimation unit 66, a background determination unit 67, and a detection unit 68 by performing the program stored in the storage unit 51. In other words, the control unit 35 includes the estimation unit 66, the background determination unit 67, and the detection unit 68.

The estimation unit 66 calculates a background estimation value, based on the background color data 52 and the white data 53. The background estimation value is the luminance value estimated to be acquired when the plurality of image sensors 33 read the background plate 34.

The estimation unit 66 calculates the background estimation value for each of the image sensors 33. For example, when the reading unit 31 includes N image sensors 33, the estimation unit 66 calculates N background estimation values. For example, when the reading unit 31 performs color scanning, the estimation unit 66 calculates the background estimation value for each of the three colors of RGB.

The estimation unit 66 estimates a first background estimation value and a second background estimation value. The first background estimation value is, for example, the luminance value estimated to be acquired when the plurality of image sensors 33 read the background plate 34 without the carrier sheet interposed therebetween. The second background estimation value is, for example, the luminance value estimated to be acquired when the plurality of image sensors 33 read the background plate 34 through the carrier sheets.

The estimation unit 66 calculates the first background estimation value, based on a ratio between the background color data 52 and the white data 53, for example. The estimation unit 66 sets the ratio of the background color data 52 to the white data 53 as the first background estimation value. For example, the estimation unit 66 calculates the first background estimation value as follows.

First background estimation value=255×(background color data/white data)

255 being a coefficient is a value indicating a maximum luminance value. This is based on that the luminance value is represented in 256 gradations from 0 to 255.

Figure 6:
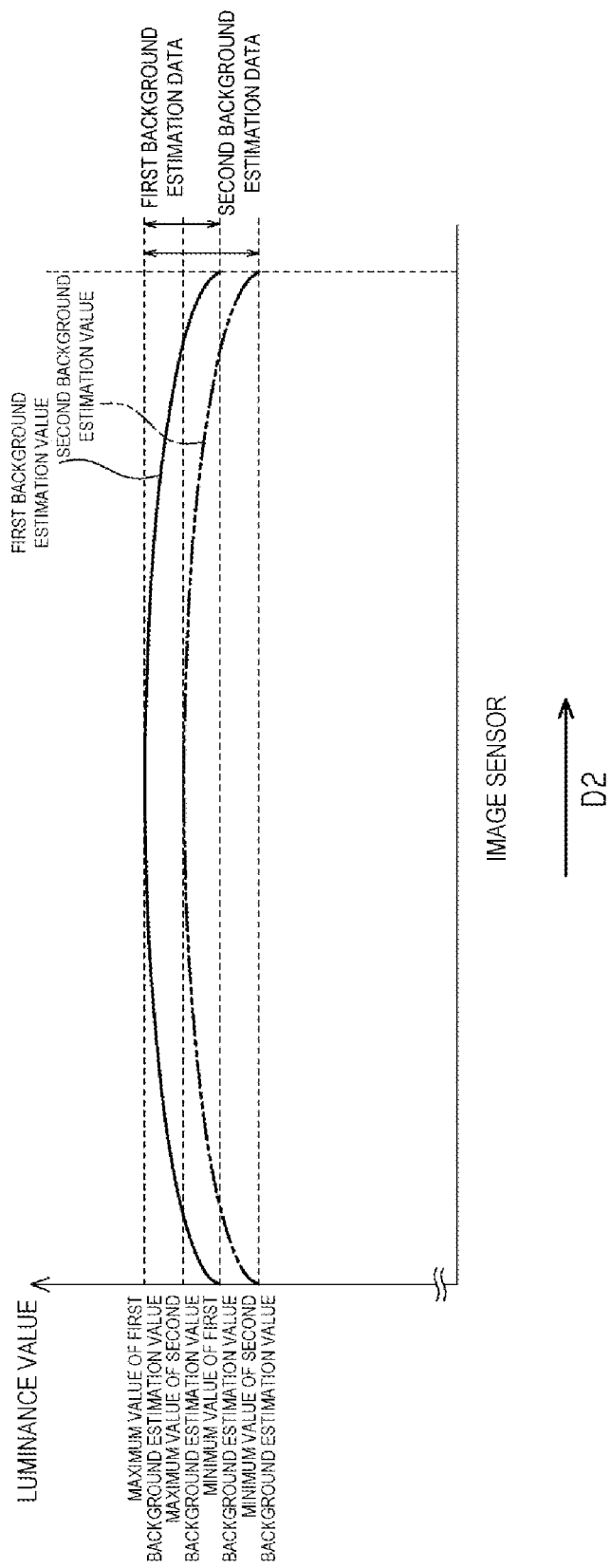
FIG. 6 is a graph illustrating a background estimation value.

As illustrated in FIG. 6, the first background estimation value is different for each of the image sensors 33, for example. For example, in the main scanning direction D2, the first background estimation value of the image sensor 33 located at an end is more likely to be lower than the first background estimation value of the image sensor 33 located at the center. Thus, the first background estimation value changes so as to draw an arch in the main scanning direction D2. This is a characteristic of the contact-type image sensor.

It is also conceivable that the first background estimation value locally increases or decreases due to an individual difference of the image sensor 33. It is also conceivable that the first background estimation value locally increases or decreases due to color unevenness of the background plate 34.

The estimation unit 66 extracts a maximum value of the first background estimation value and a minimum value of the first background estimation value. A range from the minimum value or more of the first background estimation value to the maximum value or less of the first background estimation value can be estimated to be the luminance value output by the image sensor 33 reading the background plate 34 without the carrier sheet interposed therebetween. Therefore, the estimation unit 66 sets, as the first background estimation data 58, the range from the minimum value or more of the first background estimation value to the maximum value or less of the first background estimation value. In other words, the estimation unit 66 stores, in the storage unit 51, the range from the minimum value or more of the first background estimation value to the maximum value or less of the first background estimation value as the first background estimation data 58.

The estimation unit 66 estimates the second background estimation value by multiplying the first background estimation value by the value indicated by the coefficient data 55. The coefficient data 55 is, for example, a numerical value less than one. The value indicated by the coefficient data 55 is a coefficient indicating a proportion of the luminance value that changes by the carrier sheets. Thus, the background estimation value when the carrier sheet is used, that is, the second background estimation value is calculated by multiplying the first background estimation value by the value indicated by the coefficient data 55.

The estimation unit 66 extracts a maximum value of the second background estimation value and a minimum value of the second background estimation value. A range from the minimum value or more of the second background estimation value to the maximum value or less of the second background estimation value can be estimated to be the luminance value output by the image sensor 33 reading the background plate 34 through the carrier sheet interposed therebetween. The maximum value of the second background estimation value is smaller than the maximum value of the first background estimation value. The minimum value of the second background estimation value is smaller than the minimum value of the first background estimation value.

The estimation unit 66 sets, as the second background estimation data 59, a range from the minimum value or more of the second background estimation value to the maximum value or less of the first background estimation value. In other words, the estimation unit 66 stores, in the storage unit 51, the range from the minimum value or more of the second background estimation value to the maximum value or less of the first background estimation value as the second background estimation data 59. The reason why the range from the minimum value or more of the second background estimation value to the maximum value or less of the second background estimation value is not set as the second background estimation data 59 is that the second pixel 44 is included in the background region 42. Therefore, it can also be said that the estimation unit 66 sets the second background estimation data 59 by multiplying the minimum value of the luminance value indicated by the first background estimation data 58 by the value indicated by the coefficient data 55.

As illustrated in FIG. 3, the background determination unit 67 determines the background range data 57, based on the background estimation data 54. When the background estimation data 54 is used as the background range as it is, the background region 42 may be detected as the document region 41 due to deterioration of the image sensor 33, an influence of a surrounding environment, and the like. Thus, the background determination unit 67 uses the margin data 56 to include a margin in the luminance value indicated by the background estimation data 54. In this way, the background determination unit 67 determines the background range data 57.

The background determination unit 67 adds the margin indicated by the margin data 56 to the luminance value indicated by the background estimation data 54. In this way, the background determination unit 67 determines, as the background range, a range larger than the range of the luminance value indicated by the background estimation data 54. Therefore, the background range is larger than the range of the luminance value indicated by the background estimation data 54. A specific method for determining the background range will be described below. The background determination unit 67 stores, in the storage unit 51, the determined background range as the background range data 57.

The detection unit 68 detects the document region 41 from the image data 40, based on the background range data 57. For example, when the reading unit 31 performs color scanning, the detection unit 68 regards, as the background region 42, a pixel having the luminance value within the background range in all the three colors of RGB. The detection unit 68 regards, as the document region 41, a pixel having the luminance value outside the background range in any one of the three colors of RGB. In such a manner, the detection unit 68 detects the document region 41. The detection unit 68 can acquire position information about the document M1, the size of the document M1, an inclination of the document M1, and the like by detecting the document region 41. For example, the acquired information is transmitted from the control unit 35 to the driver 37.

When the reading unit 31 performs color scanning, the detection unit 68 may regard, as the background region 42, the pixel having the luminance value within the background range in any one of the three colors of RGB. When a size of a set of the pixels having the luminance value outside the background range is equal to or more than a predetermined size, the detection unit 68 may regard the pixels as the document region 41. The detection unit 68 may regard, as the document region 41, a set of the pixels having the luminance value outside the background range by detecting an edge of the set of the pixels.

Next, the method for determining the background range will be described. The background range is determined based on the background estimation data 54 and the margin data 56. Here, two examples will be described. First, an example illustrated in FIG. 7 will be described. In the example illustrated in FIG. 7, the document M1 is transported through the second transport path 23 when the carrier sheet is used, and the document M1 is transported through the first transport path 22 when the carrier sheet is not used. Therefore, in the example illustrated in FIG. 7, the background range data 57 includes two background ranges.

As illustrated in FIG. 7, the background range data 57 includes a first background range and a second background range. The first background range is determined based on the first background estimation data 58. The first background range is determined based on the first margin data 61 and the common margin data 63. The second background range is determined based on the second background estimation data 59. The second background range is determined based on the second margin data 62 and the common margin data 63.

As illustrated in FIG. 8, the control unit 35 adds a value indicated by the common margin data 63 to a maximum value of a luminance value indicated by the first background estimation data 58. In this way, a margin of the value indicated by the common margin data 63 from the maximum value of the luminance value indicated by the first background estimation data 58 is ensured. The margin ensured by the common margin data 63 is a common margin. The control unit 35 sets, as a maximum value of the first background range, a value obtained by adding the common margin to the maximum value of the luminance value indicated by the first background estimation data 58.

The control unit 35 subtracts a value indicated by the first margin data 61 from a minimum value of the luminance value indicated by the first background estimation data 58. In this way, a margin of the value indicated by the first margin data 61 from the minimum value of the luminance value indicated by the first background estimation data 58 is ensured. The margin ensured by the first margin data 61 is a first margin. The control unit 35 sets, as a minimum value of the first background range, a value obtained by subtracting the first margin from the minimum value of the luminance value indicated by the first background estimation data 58. In other words, the control unit 35 sets, as the minimum value of the first background range, a value obtained by subtracting the first margin from the minimum value of the first background estimation value.

Figure 9:
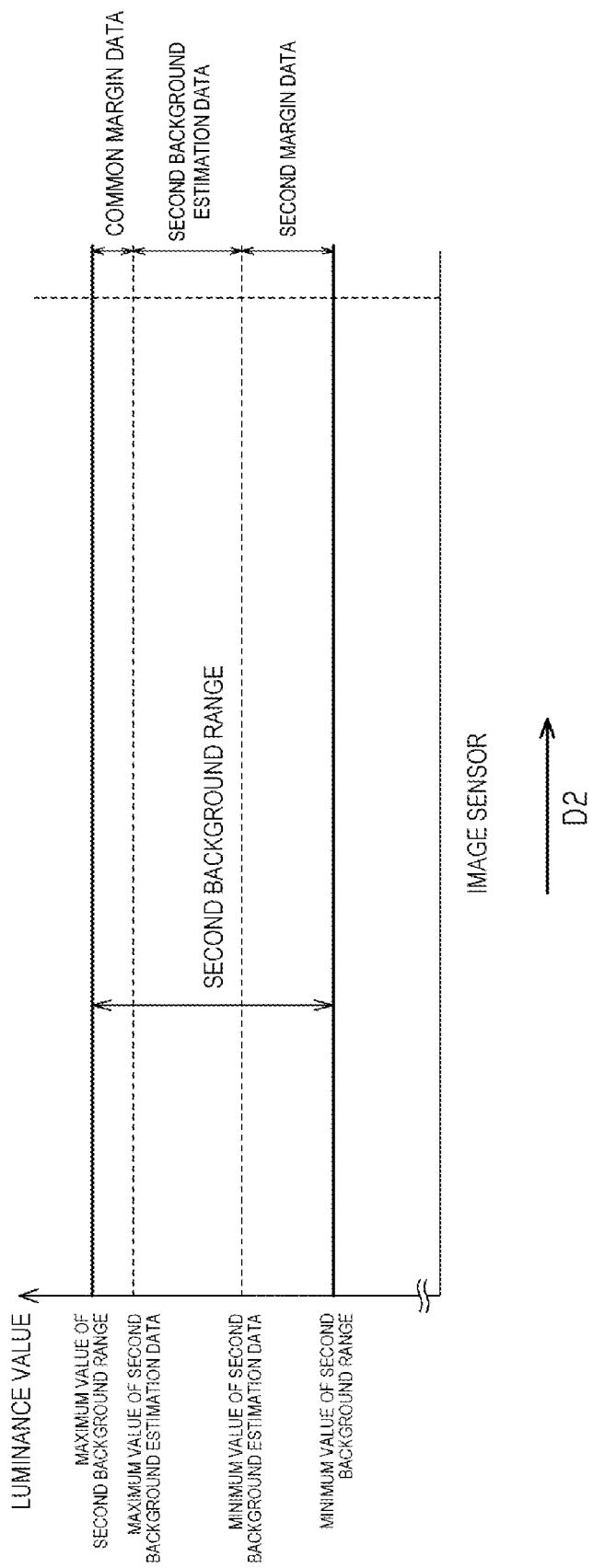
FIG. 9 is a graph illustrating a second background range.

As illustrated in FIG. 9, the control unit 35 adds a value indicated by the common margin data 63 to a maximum value of a luminance value indicated by the second background estimation data 59. In this way, a margin of the value indicated by the common margin data 63 from the maximum value of the luminance value indicated by the second background estimation data 59 is ensured. The control unit 35 sets, as a maximum value of the second background range, a value obtained by adding the common margin to the maximum value of the luminance value indicated by the second background estimation data 59.

The control unit 35 subtracts a value indicated by the second margin data 62 from a minimum value of the luminance value indicated by the second background estimation data 59. In this way, a margin of the value indicated by the second margin data 62 from the minimum value of the luminance value indicated by the second background estimation data 59 is ensured. The margin ensured by the second margin data 62 is a second margin. The second margin is greater than the first margin. The control unit 35 sets, as a minimum value of the second background range, a value obtained by subtracting the second margin from the minimum value of the luminance value indicated by the second background estimation data 59. In other words, the control unit 35 sets, as the minimum value of the second background range, a value obtained by subtracting the second margin from the minimum value of the second background estimation value.

The first background range is determined by determining the maximum value of the first background range and the minimum value of the first background range. The second background range is determined by determining the maximum value of the second background range and the minimum value of the second background range. The second background range is smaller than the first background range.

Next, an example illustrated in FIG. 10 will be described. In the example illustrated in FIG. 10, the document M1 is transported through the second transport path 23 when the carrier sheet is used, and the document M1 is transported through the first transport path 22 or the second transport path 23 when the carrier sheet is not used. Therefore, in the example illustrated in FIG. 10, the background range data 57 includes three background ranges.

As illustrated in FIG. 10, the background range data 57 includes a first background range, a second background range, and a third background range. Similarly to the example illustrated in FIG. 7, the first background range is determined based on the first background estimation data 58, the first margin data 61, and the common margin data 63. Similarly to the example illustrated in FIG. 7, the second background range is determined based on the second background estimation data 59, the second margin data 62, and the common margin data 63. The third background range is determined based on the first background estimation data 58. The third background range is determined based on the second margin data 62 and the common margin data 63.

Figure 11:
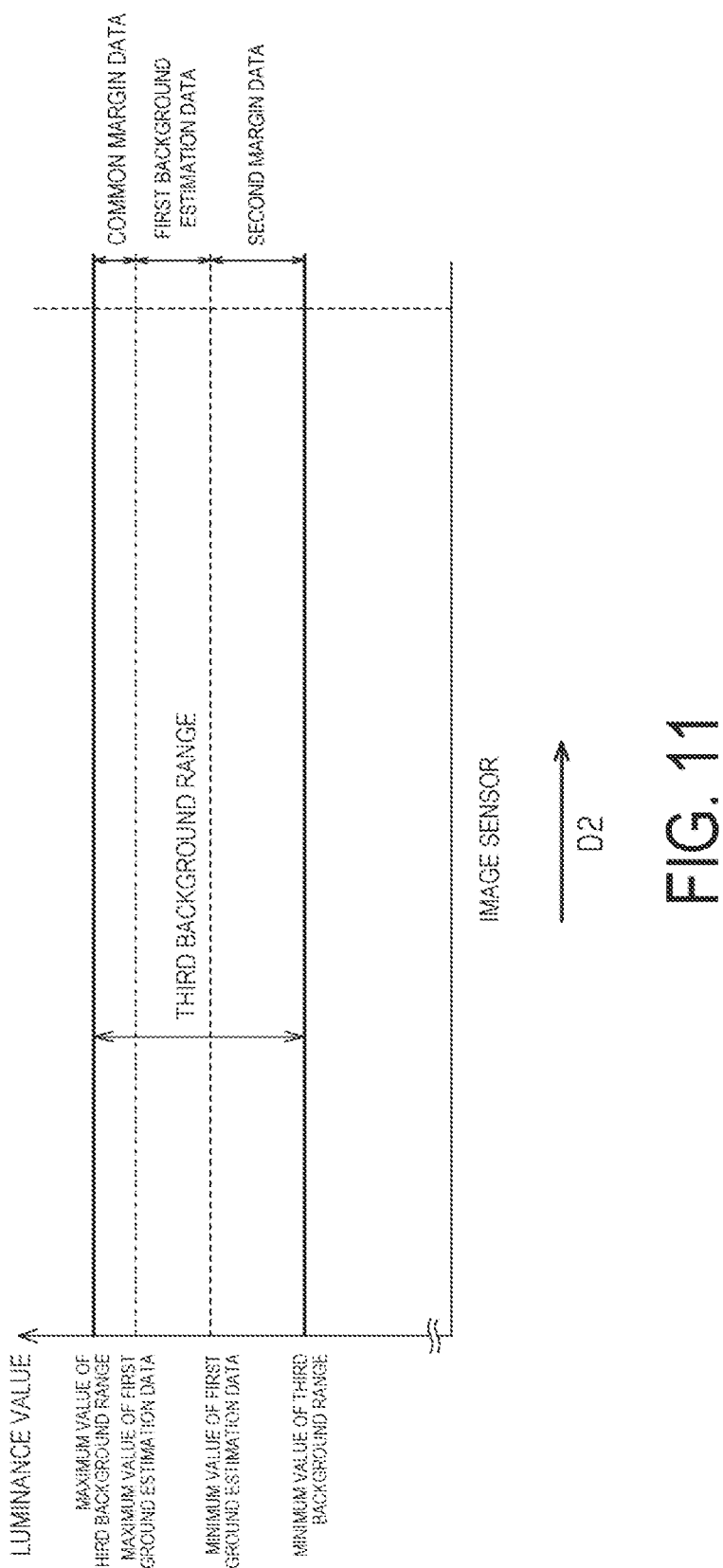
FIG. 11 is a graph illustrating a third background range.

As illustrated in FIG. 11, the control unit 35 adds a value indicated by the common margin data 63 to a maximum value of a luminance value indicated by the first background estimation data 58. In this way, a common margin from the maximum value of the luminance value indicated by the first background estimation data 58 is ensured. The control unit 35 sets, as a maximum value of the third background range, a value obtained by adding the common margin to the maximum value of the luminance value indicated by the first background estimation data 58.

The control unit 35 subtracts a value indicated by the second margin data 62 from a minimum value of the luminance value indicated by the first background estimation data 58. In this way, a second margin from the minimum value of the luminance value indicated by the first background estimation data 58 is ensured. The control unit 35 sets, as a minimum value of the third background range, a value obtained by subtracting the second margin from the minimum value of the luminance value indicated by the first background estimation data 58. In other words, the control unit 35 sets, as the minimum value of the third background range, a value obtained by subtracting the second margin from the minimum value of the first background estimation value.

The third background range is determined by determining the maximum value of the third background range and the minimum value of the third background range. The third background range is greater than the first background range and smaller than the second background range. The minimum value of the third background range is smaller than the minimum value of the first background range and greater than the minimum value of the second background range.

The background range is not limited to the examples illustrated in FIGS. 7 and 10, and may be finely set based on the document size information, the document thickness information, and the like. For example, the number of pieces of the background estimation data 54 may be one, or three or more. The number of pieces of the margin data 56 may be two or less, or four or more. Various background ranges can be determined by a combination of the background estimation data 54 and the margin data 56. The determined background range is stored in the storage unit 51 in association with the document information.

Next, setting processing of setting a background range will be described. For example, when a command to read the document M1 is input, the control unit 35 performs the setting processing. The control unit 35 sets a background range, based on document information, by performing the setting processing.

Figure 12:
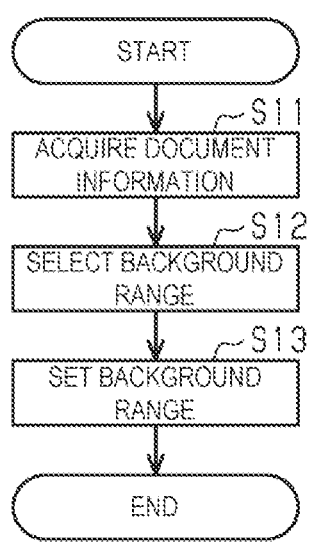
FIG. 12 is a flowchart illustrating setting processing.

As illustrated in FIG. 12, in step S11, the control unit 35 acquires document information. At this time, the control unit 35 acquires the document information from the first posture detection sensor 27, the second posture detection sensor 28, the size detection sensor 29, the thickness detection sensor 30, the driver 37, and the like.

In step S12, the control unit 35 selects a background range, based on the document information. At this time, the control unit 35 selects the background range associated with the acquired background range. First, the example illustrated in FIG. 7 will be considered.

As illustrated in FIG. 7, when the document information indicates that the document M1 is transported through the first transport path 22, the control unit 35 selects the first background range. When the document information indicates that the housing 12 has the first posture, the control unit 35 selects the first background range. When the document information indicates that the carrier sheet is not used, the control unit 35 selects the first background range. In the example illustrated in FIG. 7, when the document M1 is transported through the first transport path 22 and when the housing 12 has the first posture, the carrier sheet is not used. Thus, the first background range is selected.

When the document information indicates that the document M1 is transported through the second transport path 23, the control unit 35 selects the second background range. When the document information indicates that the housing 12 has the second posture, the control unit 35 selects the second background range. When the document information indicates that the carrier sheet is used, the control unit 35 selects the second background range. In the example illustrated in FIG. 7, when the document M1 is transported through the second transport path 23 and when the housing 12 has the second posture, the carrier sheet is used. Thus, the second background range is selected.

Next, the example illustrated in FIG. 10 will be considered.

As illustrated in FIG. 10, when the document information indicates that the document M1 is transported through the first transport path 22, the control unit 35 selects the first background range. When the document information indicates that the housing 12 has the first posture, the control unit 35 selects the first background range. The reason is that, when the document M1 is transported through the first transport path 22 and when the housing 12 has the first posture, the carrier sheet is not used.

When the document information indicates that the document M1 is transported through the second transport path 23, the control unit 35 selects the second background range or the third background range. When the document information indicates that the housing 12 has the second posture, the control unit 35 selects the second background range or the third background range. The reason is that, when the document M1 is transported through the second transport path 23 and when the housing 12 has the second posture, the carrier sheet may be used.

When the document information indicates that the document M1 is transported through the second transport path 23 and when the document information indicates that the carrier sheet is used, the control unit 35 selects the second background range. When the document information indicates that the housing 12 has the second posture and when the document information indicates that the carrier sheet is used, the control unit 35 selects the second background range. The reason is that the carrier sheet is used.

When the document information indicates that the document M1 is transported through the second transport path 23 and when the document information indicates that the carrier sheet is not used, the control unit 35 selects the third background range. When the document information indicates that the housing 12 has the second posture and when the document information indicates that the carrier sheet is not used, the control unit 35 selects the third background range. The reason is that the carrier sheet is not used.

As illustrated in FIG. 12, in step S13, the control unit 35 sets the background range data 57. At this time, the control unit 35 sets the selected background range. When the control unit 35 is coupled to the terminal 36, the control unit 35 transmits the set background range data 57 to the driver 37. The background range data 57 transmitted to the driver 37 is used in image processing by the driver 37. When the processing of step S13 ends, the control unit 35 ends the setting processing. When the setting processing ends, reading of the document M1 starts. The control unit 35 detects the document region 41 from the image data 40 obtained by reading the document M1, based on the set background range data 57.

According to the example illustrated in FIG. 7, the control unit 35 sets the first background range when the usage information indicates that the carrier sheet is not used. The control unit 35 sets the first background range when the path information indicates that the document M1 is transported through the first transport path 22. The control unit 35 sets the first background range when the posture information indicates that the housing 12 has the first posture. The control unit 35 sets the second background range when the usage information indicates that the carrier sheet is used. The control unit 35 sets the second background range when the path information indicates that the document M1 is transported through the second transport path 23. The control unit 35 sets the second background range when the posture information indicates that the housing 12 has the second posture.

According to the example illustrated in FIG. 10, the control unit 35 sets the first background range when the path information indicates that the document M1 is transported through the first transport path 22. The control unit 35 sets the first background range when the posture information indicates that the housing 12 has the first posture. The control unit 35 sets the second background range when the usage information indicates that the carrier sheet is used. The control unit 35 sets the third background range when the usage information does not include that the carrier sheet is not used and when the path information indicates that the document M1 is transported through the second transport path 23. The control unit 35 sets the third background range when the usage information indicates that the carrier sheet is not used and when the posture information indicates that the housing 12 is in the second posture.

As described above, the background range set for each document M1 changes based on the document information. In this way, an appropriate background range for each document M1 is set. In such a manner, a method for controlling the reading device 11 according to the present example includes acquiring document information and setting a background range, based on the document information.

In the present example, the control unit 35 reads a background range from the storage unit 51, based on acquired document information, but, for example, the control unit 35 may calculate a background range each time, based on document information. In this case, the control unit 35 sets the calculated background range.

Next, the functions and effects of the exemplary embodiment described above will be described.

(1) The control unit 35 acquires document information about the document M1. The control unit 35 sets, based on the document information, a background range indicating a range of a luminance value regarded as the background region 42. According to the configuration described above, the background range is set based on the document information, and thus the document M1 can be appropriately read in accordance with a type of the document M1.

(2) The control unit 35 sets the first background range when the usage information indicates that the carrier sheet is not used. The control unit 35 sets the second background range when the usage information indicates that the carrier sheet is used. A minimum value of the second background range is smaller than a minimum value of the first background range.

When the carrier sheet is used, the luminance value of the background region 42 is more likely to be smaller than that when the carrier sheet is not used. Therefore, in a case in which the same background range is set when the carrier sheet is used and when the carrier sheet is not used, the document region 41 may not be able to be detected.

According to the configuration described above, when the carrier sheet is used, the second background range is set. The minimum value of the second background range is smaller than the minimum value of the first background range. In other words, a background range having a smaller minimum value is set in accordance with a smaller luminance value of the background region 42. In this way, the document M1 can be appropriately read in accordance with the usage of the carrier sheet.

(3) The control unit 35 sets the first background range when the path information indicates that the document M1 is transported through the first transport path 22. The control unit 35 sets the second background range when the path information indicates that the document M1 is transported through the second transport path 23. A minimum value of the second background range is smaller than a minimum value of the first background range.

The first transport path 22 includes the curved portion 25, and thus the document M1 may not be able to be transported through the first transport path 22 depending on a thickness of the document M1. Thus, the document M1 transported through the second transport path 23 has a thickness greater than that of the document M1 transported through the first transport path 22. When the document M1 having a great thickness is read, the luminance value of the background region 42 is more likely to be smaller than that when the document M1 having a small thickness is read. Therefore, in a case in which the same background range is set when the document M1 is transported through the first transport path 22 and when the document M1 is transported through the second transport path 23, the document region 41 may not be able to be detected.

According to the configuration described above, when the document M1 is transported through the second transport path 23, the second background range is set. The minimum value of the second background range is smaller than the minimum value of the first background range. In other words, a background range having a smaller minimum value is set in accordance with a smaller luminance value of the background region 42. In this way, the document M1 can be appropriately read in accordance with a thickness of the document M1.

(4) The control unit 35 sets the first background range when the posture information indicates that the housing 12 has the first posture. The control unit 35 sets the second background range when the posture information indicates that the housing 12 has the second posture. According to the configuration described above, a background range in accordance with a thickness of the document M1 is set according to a posture of the housing 12. In this way, the document M1 can be appropriately read in accordance with a thickness of the document M1.

(5) The control unit 35 acquires a background estimation value indicating a luminance value estimated to be acquired when the plurality of image sensors 33 read the background plate 34. The control unit 35 sets, as a minimum value of the first background range, a luminance value obtained by subtracting a first margin from a minimum value of the background estimation value. The control unit 35 sets, as a minimum value of the second background range, a luminance value obtained by subtracting a second margin from the minimum value of the background estimation value. The second margin is a value greater than the first margin. According to the configuration described above, a background range includes a margin, and thus, even when a luminance value of the image data 40 varies, the document region 41 can be appropriately detected.

(6) The control unit 35 acquires the document information, based on a detection signal of the sensor.

According to the configuration described above, the control unit 35 can set a background range, based on a detection signal of the sensor.

(7) The control unit 35 acquires the document information from the terminal 36.

According to the configuration described above, the control unit 35 can set a background range by acquiring the document information from the terminal 36.

The present example may be modified and implemented as follows. The present example and modified examples thereof to be described below may be implemented in combination within a range in which a technical contradiction does not arise.

Figure 13:
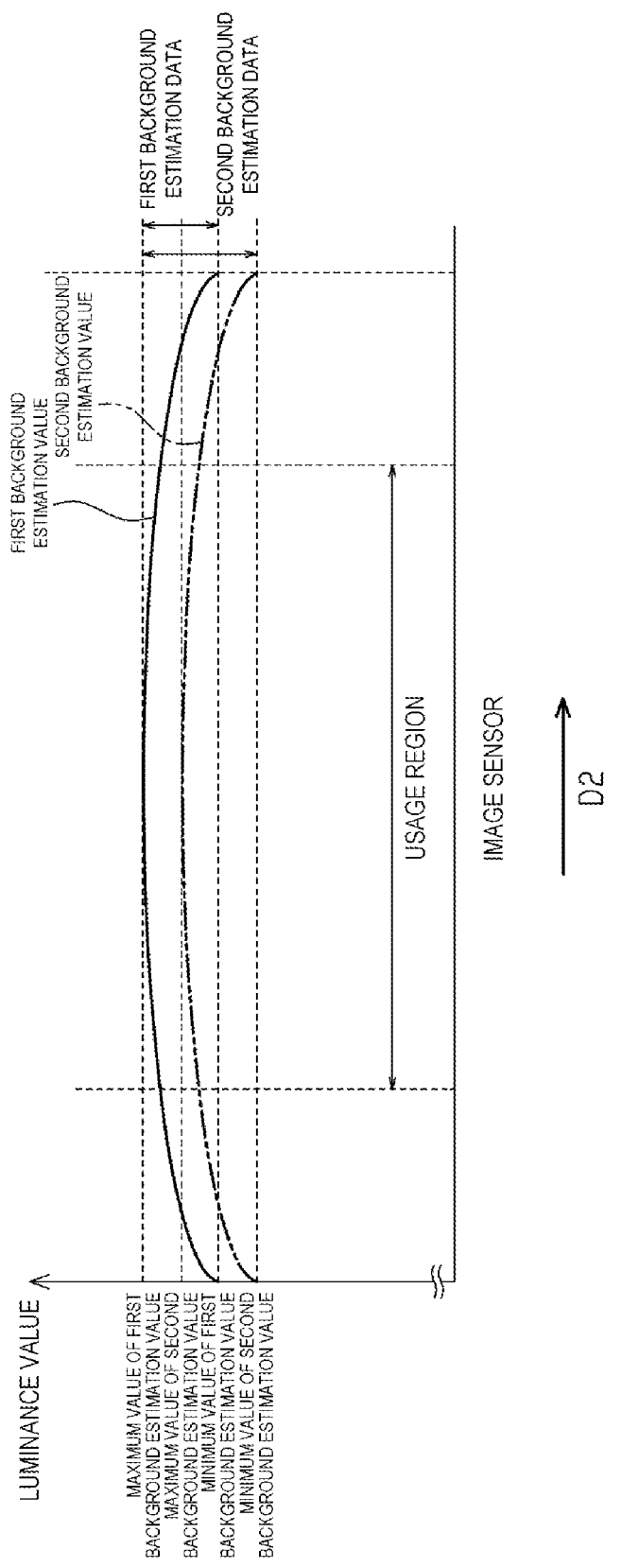
FIG. 13 is a graph illustrating a usage region of the background estimation value.

As illustrated in FIG. 13, the control unit 35 may set a usage region of the background estimation value, based on the document size information. The usage region is a region indicating a width of the background estimation value used to define the background range. The width of the background estimation value to be used is limited by the usage region. For example, the width of the background estimation value may be limited in accordance with a width of the document M1.

When the document M1 having a small width is read, the image sensor 33 located at the end of the plurality of image sensors 33 aligned in the main scanning direction D2 only reads the background plate 34. Further, an output by the image sensor 33 located at the end of the plurality of image sensors 33 aligned in the main scanning direction D2 is more likely to be smaller than that by the image sensor 33 located at the center. Thus, the control unit 35 sets the usage region, based on the document size information with reference to the center in the main scanning direction D2.

When the usage region is set, the background estimation value of the image sensor 33 in which the output is more likely to be small is not used in determination of the background range. In the usage region, a difference between a maximum value of the background estimation value and a minimum value of the background estimation value is small. Thus, a variation in the background estimation value is reduced in the usage region. According to the modified example, the following effect can be obtained.

(8) The control unit 35 sets a usage region of the background estimation value, based on the document size information. The control unit 35 sets the background range, based on the background estimation value in the usage region.

According to the configuration described above, the usage region of the background estimation value is set in accordance with a size of the document M1. A variation in the background estimation value is reduced by setting the usage region. In other words, when the background range is set, an influence due to a variation in an output of the image sensor 33 is reduced. As a result, accuracy of the background range improves.

Figure 14:
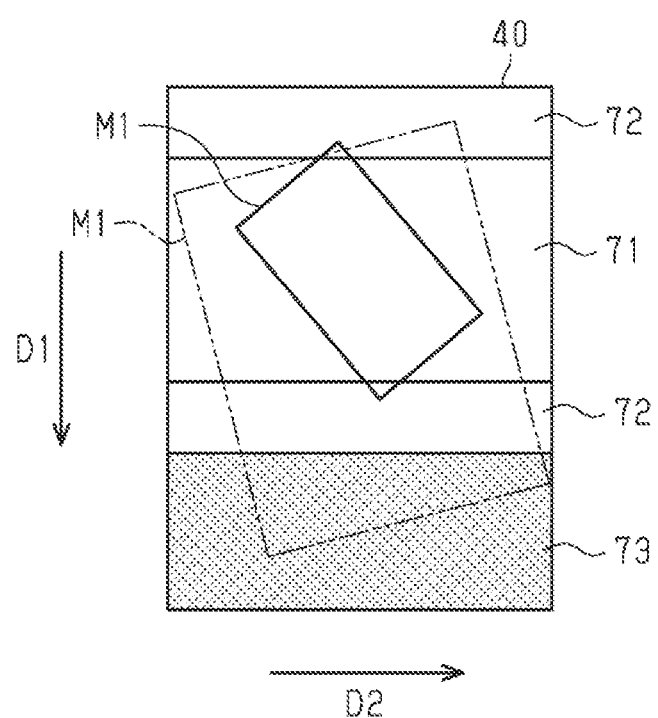
FIG. 14 is a schematic view illustrating a capacity difference of the image data.

As illustrated in FIG. 14, the control unit 35 may adjust, based on the document size information, a capacity used for storing the image data 40. The capacity used for storing the image data 40 is reduced when the document M1 having a short length in the sub scanning direction D1 is read as compared to when the document M1 having a long length in the sub scanning direction D1 is read. The control unit 35 may adjust the capacity used for storing the image data 40, based on image quality when the document M1 is read, instead of only the size of the document M1.

The image data 40 includes, for example, a document-specific region 71 and two margin regions 72. Thus, the storage unit 51 ensures a capacity of the document-specific region 71 and the two margin regions 72. The document-specific region 71 is a region set in accordance with dimensions of the document M1 in the sub scanning direction D1. When a posture of the document M1 is not inclined with respect to the sub scanning direction D1, the document M1 falls within the document-specific region 71. The two margin regions 72 are adjacent to both ends of the document-specific region 71 in the sub scanning direction D1. When the document M1 is inclined with respect to the sub scanning direction D1, a part of the document M1 may protrude from the document-specific region 71. A part of the document M1 protruding from the document-specific region 71 is located in the margin region 72. In other words, the margin region 72 is a region ensured so as to be able to read the entire document M1 when the document M1 is inclined. The margin region 72 has a fixed size regardless of a size of the document M1.

By changing the document-specific region 71 in accordance with a size of the document M1, an unnecessary region 73 is generated in the image data 40 when the document M1 having a small size is read as compared to when the document M1 having a large size is read. In other words, a capacity used for storing the image data 40 can be reduced by the unnecessary region 73. According to the modified example, the following effect can be obtained.

(9) The control unit 35 adjusts, based on the document size information, a capacity used for storing the image data 40 by the storage unit 51.

According to the configuration described above, for example, when a size of the document M1 is small, the capacity used for storing the image data 40 can be reduced. In this way, the reduced capacity can be used for another function.

The margin data 56 may be a different value in the three colors of RGB, for example. —A maximum value of the background range is common in all of the first background range, the second background range, and the third background range, but may be different. For example, a maximum value of the background range may be set different by setting a different margin added to a maximum value of the background estimation value.

Hereinafter, technical concepts and effects thereof that are understood from the above-described embodiments and modified examples will be described.

(A) A reading device includes a reading unit configured to read a document, and a control unit configured to acquire image data including a document region and a background region from the reading unit, where the control unit acquires document information about a document, and sets, based on the document information, a background range indicating a range of a luminance value regarded as the background region. According to the configuration described above, the background range is set based on the document information, and thus a document can be appropriately read in accordance with a type of the document.

(B) In the reading device described above, the document information may include usage information indicating whether a carrier sheet that sandwiches a document is used, the control unit may set a first background range when the usage information indicates that the carrier sheet is not used, and may set a second background range when the usage information indicates that the carrier sheet is used, and a minimum value of the second background range may be smaller than a minimum value of the first background range.

When the carrier sheet is used, the luminance value of the background region is more likely to be smaller than that when the carrier sheet is not used. Therefore, in the case in which the same background range is set when the carrier sheet is used and when the carrier sheet is not used, the document region may not be able to be detected.

According to the configuration described above, when the carrier sheet is used, the second background range is set. The minimum value of the second background range is smaller than the minimum value of the first background range. In other words, a background range having a smaller minimum value is set in accordance with a smaller luminance value of the background region. In this way, a document can be appropriately read in accordance with the usage of the carrier sheet.

(C) The reading device described above includes: a first transport path including a curved portion; and a second transport path not including the curved portion, where the document information may include path information indicating a path through which a document is transported, the control unit may set a first background range when the path information indicates that a document is transported through the first transport path, and may set a second background range when the path information indicates that a document is transported through the second transport path, and a minimum value of the second background range may be smaller than a minimum value of the first background range.

The first transport path includes the curved portion, and thus a document may not be able to be transported through the first transport path depending on a thickness of the document. Thus, a document transported through the second transport path has a thickness greater than that of a document transported through the first transport path. When a document having a great thickness is read, a luminance value of the background region is more likely to be smaller than that when a document having a small thickness is read. Therefore, in a case in which the same background range is set when the document is transported through the first transport path and when the document is transported through the second transport path, the document region may not be able to be detected.

According to the configuration described above, when the document is transported through the second transport path, the second background range is set. The minimum value of the second background range is smaller than the minimum value of the first background range. In other words, a background range having a smaller minimum value is set in accordance with a smaller luminance value of the background region. In this way, the document can be appropriately read in accordance with a thickness of the document.

(D) The reading device described above includes a housing configured to accommodate the reading unit, and configured to switch a posture thereof between a first posture and a second posture, where, when the housing is in the first posture, a document may be transported through the first transport path, when the housing is in the second posture, a document may be transported through the second transport path, the document information may include posture information indicating a posture of the housing, and the control unit may set the first background range when the posture information indicates that the housing is in the first posture, and may set the second background range when the posture information indicates that the housing is in the second posture. According to the configuration described above, the background range in accordance with a thickness of the document is set according to a posture of the housing. In this way, the document can be appropriately read in accordance with a thickness of the document.

(E) In the reading device described above, the reading unit may include a plurality of image sensors aligned in a main scanning direction, and a background plate read as a background together with a document by the image sensors, the control unit may acquire a background estimation value indicating a luminance value estimated to be acquired when the plurality of image sensors read the background plate, may set, as a minimum value of the first background range, a luminance value obtained by subtracting a first margin from a minimum value of the background estimation value, may set, as a minimum value of the second background range, a luminance value obtained by subtracting a second margin from the minimum value of the background estimation value, and the second margin may be a value greater than the first margin. According to the configuration described above, a background range includes a margin, and thus, even when a luminance value of the image data varies, the document region can be appropriately detected.

(F) In the reading device described above, the document information may include document size information indicating a size of a document, and the control unit may set a usage region of the background estimation value, based on the document size information, and may set the background range, based on the background estimation value in the usage region.

An output of the image sensor located at the end of the plurality of image sensors aligned in the main scanning direction is normally more likely to be lower than that of the image sensor located at the center. In other words, in the main scanning direction, a luminance value at the end of a document is more likely to be smaller than a luminance value at the center of the document. According to the configuration described above, the usage region of the background estimation value is set in accordance with a size of the document. A variation in the background estimation value is reduced by setting the usage region. In other words, when the background range is set, an influence due to a variation in an output of the image sensor is reduced. As a result, accuracy of the background range improves.

(G) The reading device described above includes a storage unit configured to store the image data, where the document information may include document size information indicating a size of a document, and the control unit may adjust, based on the document size information, a capacity used for storing the image data by the storage unit. According to the configuration described above, for example, when a size of the document is small, the capacity used for storing the image data can be reduced. In this way, the reduced capacity can be used for another function.

(H) The reading device described above includes a sensor, where the control unit may acquire the document information, based on a detection signal of the sensor.

According to the configuration described above, the control unit can set the background range, based on a detection signal of the sensor.

(I) In the reading device described above, the control unit may acquire the document information from a terminal operated by a user.

According to the configuration described above, the control unit can set the background range by acquiring the document information from the terminal operated by the user.

(J) A method for controlling a reading device is a method for controlling a reading device configured to read a document, and includes acquiring document information about a document, and setting, based on the document information, a background range indicating a range of a luminance value regarded as a background region. According to the method described above, an effect similar to that of the reading device described above can be obtained.

What is claimed is:

1. A reading device comprising:
a reading sensor configured to read a document; and
a controller configured to acquire image data including a document region and a background region from the reading sensor, wherein
the controller
acquires document information about a document, and
sets, based on the document information, a background range indicating a range of a luminance value regarded as the background region, wherein
the document information includes usage information indicating whether a carrier sheet that sandwiches a document is used,
the controller
sets a first background range when the usage information indicates that the carrier sheet is not used, and
sets a second background range when the usage information indicates that the carrier sheet is used, and
a minimum value of the second background range is smaller than a minimum value of the first background range.

2. The reading device according to claim 1, wherein
the reading sensor includes a plurality of image sensors aligned in a main scanning direction, and a background plate read as a background together with a document by the plurality of image sensors,
the controller
acquires a background estimation value indicating a luminance value estimated to be acquired when the plurality of image sensors read the background plate, sets, as a minimum value of the first background range, a luminance value obtained by subtracting a first margin from a minimum value of the background estimation value, sets, as a minimum value of the second background range, a luminance value obtained by subtracting a second margin from the minimum value of the background estimation value, and the second margin is a value greater than the first margin.

3. The reading device according to claim 2, wherein
the document information includes document size information indicating a size of a document, and
the controller
sets a usage region of the background estimation value, based on the document size information, and
sets the background range, based on the background estimation value in the usage region.

4. The reading device according to claim 1, comprising
a non-transitory hardware storage device configured to store the image data, wherein
the document information includes document size information indicating a size of a document, and
the controller adjusts, based on the document size information, a capacity used for storing the image data by the non-transitory hardware storage device.

5. The reading device according to claim 1, comprising
a sensor, wherein
the controller acquires the document information, based on a detection signal of the sensor.

6. The reading device according to claim 1, wherein
the controller acquires the document information from a terminal operated by a user.

7. A reading device comprising:
a reading sensor configured to read a document;
a first transport path including a curved portion;
a second transport path not including the curved portion; and
a controller configured to acquire image data including a document region and a background region from the reading sensor, wherein
the controller
acquires document information about a document, and
sets, based on the document information, a background range indicating a range of a luminance value regarded as the background region, wherein
the document information includes path information indicating a path through which a document is transported, the controller
sets a first background range when the path information indicates that a document is transported through the first transport path, and
sets a second background range when the path information indicates that a document is transported through the second transport path, and
a minimum value of the second background range is smaller than a minimum value of the first background range.

8. The reading device according to claim 7, comprising
a housing configured to accommodate the reading sensor and to switch a posture thereof between a first posture and a second posture, wherein,
when the housing is in the first posture, a document is transported through the first transport path,
when the housing is in the second posture, a document is transported through the second transport path,
the document information includes posture information indicating a posture of the housing, and
the controller
sets the first background range when the posture information indicates that the housing is in the first posture, and
sets the second background range when the posture information indicates that the housing is in the second posture.

9. A method for controlling a reading device configured to read a document, the method comprising:
acquiring document information about a document; and
setting, based on the document information, a background range indicating a range of a luminance value regarded as a background region, wherein
the document information includes usage information indicating whether a carrier sheet that sandwiches a document is used,
the method further comprising:
setting a first background range when the usage information indicates that the carrier sheet is not used, and
setting a second background range when the usage information indicates that the carrier sheet is used, and
a minimum value of the second background range is smaller than a minimum value of the first background range.

* * * * *